United States Patent

[11] 3,587,264

[72] Inventor Donald J. Fapiano
       Scotia, N.Y.
[21] Appl. No. 819,729
[22] Filed Apr. 28, 1969
[45] Patented June 28, 1971
[73] Assignee General Electric Company

[54] METHOD AND APPARATUS FOR ESTIMATING WORKPIECE GAGE IN A REDUCING MILL
10 Claims, 8 Drawing Figs.

[52] U.S. Cl............................................................ 72/8
[51] Int. Cl. ..................................................... B21b 37/00
[50] Field of Search ........................................... 72/7, 8, 9, 10, 16

[56] References Cited
UNITED STATES PATENTS
2,726,541 12/1955 Sims ............................. 73/88.5
3,269,160 8/1966 Halter et al. .................. 72/8

Primary Examiner—Milton S. Mehr
Attorneys—John B. Sponsler, Gerald R. Woods, James C. Davis, Jr., Frank L. Neuhauser, Oscar B. Waddell and Arnold E. Renner ABSTRACT: A gage estimating method and apparatus for use in a plate rolling mill. Using measured roll separating forces, mill stretch curves, and plate deformation curves, a range of uncertainty as to measured gage is established. The value of the range of uncertainty is modified as a function of the predicted draft, the predicted mill stretch, and the relative probability of error in predicting draft and stretch. The modified value determines the value of the estimated gage within the range of uncertainty.

INVENTOR.
DONALD J. FAPIANO
BY Gerald R. Woods
HIS ATTORNEY 3,587,264

METHOD AND APPARATUS FOR ESTIMATING WORKPIECE GAGE IN A REDUCING MILL

BACKGROUND OF THE INVENTION

The present invention relates generally to material deforming and more particularly to the estimating of gauges of thin, hard workpieces in a reducing mill.

During the rolling of metal workpieces or plates in a rolling mill, the mill itself is distorted by roll separating forces produced by the passage of a plate between the opposed, driven rolls in the mill stand. The amount of distortion at various force levels and for plates of various widths, compositions, and temperatures has been observed. Graphs representing these observations are referred to as mill stretch curves. To determine the thickness or gauge of a workpiece delivered from the mill, a force transducer such as a load cell is used to measure the roll separating forces. The mathematical intersection of the measured force curve and the mill stretch curve for the plate being rolled determines the magnitude of the stretch of the mill. Adding the stretch distance to the unloaded roll opening yields the delivery gauge of the plate. The difference between the entry gauge and the delivery gauge of the plate is referred to as the draft taken during the reducing pass.

The described system is based on assumptions that the mill stretch curves are completely accurate and that the forces are measured with complete accuracy. During the rolling of thick, soft workpieces, the magnitude of mill stretch is normally small relative to the magnitude of the planned draft, and drafting accuracy depends primarily on the accuracy in setting the initial roll opening rather than on the accuracy of the mill stretch curves. However, where thin, hard workpieces are being rolled, the planned draft may be very much less than the stretch of the mill. In such a case, small errors in the mill stretch curve or the force measurement may result in errors in the calculated delivery gauge of the same order of magnitude as the planned draft.

A definite relationship exists between the roll separating forces exerted by a plate and the magnitude of draft. The relationship, defined graphically by a plate deformation curve, is a nonlinear function of the entry gauge, metallurgical composition, and temperature of the plate. If plate deformation curves and force measurements were completely accurate, the magnitude of draft taken during a reducing pass would be determined by the mathematical intersection of the measured force curve and the appropriate plate deformation curve. Similarly, if the appropriate mill stretch curve were completely accurate, it would intersect the measured force curve and the plate deformation curve at the same point. However, since both the mill stretch curves and the plate deformation curves are derived from theory and verified to some extent by observations, they cannot be considered to be completely accurate. For that reason, the gauge of a delivered plate remains uncertain within a limited range of gauges when the described system is used.

SUMMARY OF THE INVENTION

The present invention relates to methods and apparatus for estimating the gauge G1 of a thin, hard workpiece within a range of uncertainty bounded by (1) a first gauge G2 defined by the intersection of the measured force curve with the appropriate workpiece deformation curve and (2) by a second gauge G3 defined by the intersection of the measured force curve with the appropriate mill stretch curve. The invention includes means for establishing a first signal representing the magnitude of the gauge G3 and means for establishing a second signal representative of the range of uncertainty. Means are included for modifying the second signal as a function of the predicted draft, the predicted mill stretch, and the relative probability of error in predicting both draft and mill stretch. Means are included for combining the first signal and the modified second signal to produce a third signal representative of the gauge G1.

DESCRIPTION OF THE DRAWINGS

While the specification concludes with claims particularly pointing out and distinctly claiming that which is regarded as the present invention, details of the principles of the present invention and of particular methods and apparatus for carrying out the invention may be more readily ascertained from the following detailed description when read in conjunction with the accompanying drawings in which:

DETAILED DESCRIPTION

Figure 1:
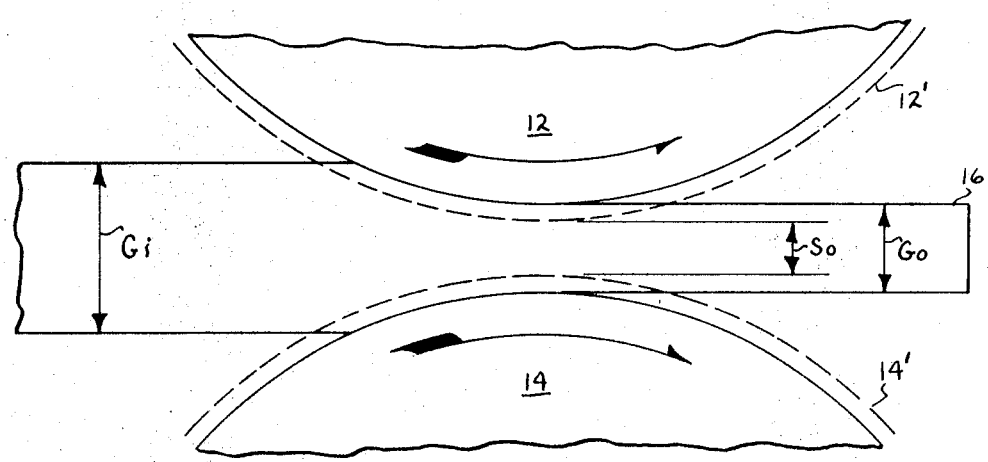
FIG. 1 is a partial view of a rolling mill to be used in defining terms appearing in the specification.

FIG. 1 shows a pair of opposed rolls 12 and 14 reducing a plate 16 from an entry gauge $G_i$ to a delivery gauge $G_o$. The difference between the entry gauge $G_i$ and the delivery gauge $G_o$ is defined as the draft taken during the reducing pass. Before the plate 16 enters the mill, the rolls 12 and 14 are closer together, occupying the spaces defined by the dotted circular arcs 12' and 14', respectively. As the plate 16 enters the mill, the rolls 12 and 14 are forced apart by surface separating forces which distort the rolls and the supports for the rolls in the mill housing. The difference between the initial separation $S_o$ of the rolls and the final separation $G_o$ of the rolls is referred to as the stretch of the mill. In other words, the stretch of the mill is equal to the total increase in the separation of the rolls due to the passage of the plate 16 between the rolls.

Figure 2:
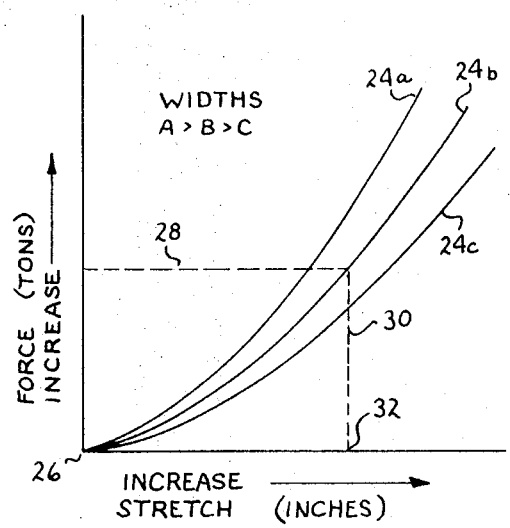
FIG. 2 shows a family of mill stretch curves.

A family of mill stretch curves 24a, 24b, 24c is shown in FIG. 2 for three different plate widths. The point 26 common to all of the mill stretch curves in the family defines a zero force, zero stretch condition which exists only when the entry gauge of a plate is equal to or less than the initial or unloaded roll separation. According to a basic system, the delivery gauge of a plate is determined by measuring the separating force with a force transducer to produce a measured force curve 28. A vertical 30 drawn from the intersection of the measured force curve 28 and an appropriate mill stretch curve 24b (for a plate of width b) intersects a stretch axis at a point 32. The distance between the points 26 and 32 indicate the stretch of the mill. When the stretch is added to the unloaded roll opening, the delivery gauge is known.

Figure 3:
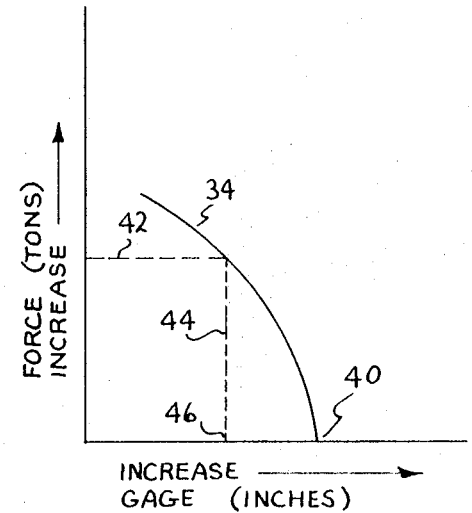
FIG. 3 shows a plate deformation curve.

Although mill stretch curves are commonly used, an alternate approach to determining delivery gauge is the use of plate deformation curves of the type shown in FIG. 3. A plate deformation curve 34 is shown intersecting a horizontal gauge axis at a point 40 which represents the entry gauge of a plate.

Deformation curves are used to determine delivery gauge in the following manner. The separating force produced by the passage of a plate between the rolls in the mill is measured by the force transducer at a level 42. The intersection of the force curve 42 and a deformation curve such as curve 34 locates the upper end of a vertical 44 extending between the curve 34 and a point 46 on the gauge axis. The distance between the points 40 and 46 on the gauge axis should indicate the draft taken during the reducing pass. The delivery gauge is simply computed by subtracting the draft from the entry gauge of the plate.

It should be understood that graphical solutions to the problems of finding delivery gauges by using mill stretch curves and plate deformation curves have been illustrated only to show the principles of operation. In practice, only the coordinates of deformation and stretch curves are stored as functions of force. The techniques for solving problems with stored coordinates for curves are well known and need not be described here.

Figure 4:
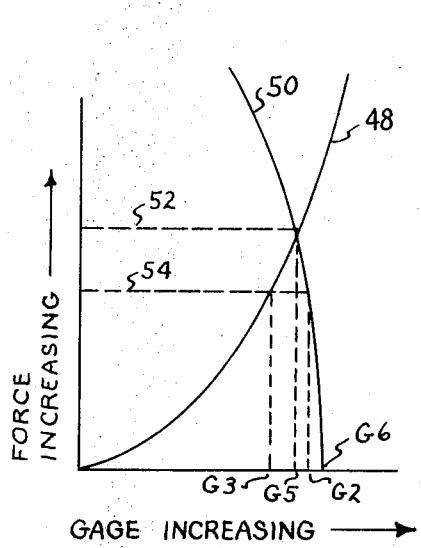
FIG. 4 shows a mill stretch curve and a plate deformation curve illustrating one set of conditions leading to uncertainty as to the delivery gauge.

Mention has been made of a range of uncertainty which results from possible inaccuracies in the mill stretch curves, the force measurements, or the plate deformation curves. FIG. 4 illustrates the meaning of the term "range of uncertainty" for one set of conditions. Ideally, a mill stretch curve 48 intersects a plate deformation curve 50 at a gauge G5 when a plate having entry gauge G6 is subjected to a predicted roll separating force 52. Actually, the measured force 54 may be somewhat less than the predicted force 52. Under these circumstances, the question is whether to rely on the mill stretch curve 48 which would indicate a delivery gauge G3 determined from the intersection of the measured force and the mill stretch curve or whether to rely on the plate deformation curve so which would indicate a delivery gauge G2 determined from the intersection of the measured force and plate deformation curves. The range of uncertainty is bounded by the gauge G2 at one extreme and the gauge G3 at the other extreme. The problem is to estimate the actual delivery gauge G1 within that range.

Figure 5:
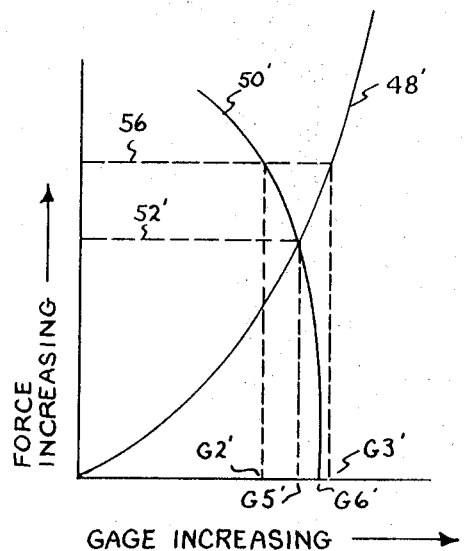
FIG. 5 shows a mill stretch curve and a plate deformation curve illustrating a different set of conditions leading to uncertainty as to the delivery gauge.

The need for methods and apparatus for estimating a delivery gauge G1 within a range of uncertainty is made even clearer in FIG. 5 wherein the measured force 56 is greater than the predicted force 52'. Even if the plate deformation curve 50', the mill stretch curve 48', and the predicted force 52' of FIG. 5 were precisely the same as the corresponding curves in FIG. 4 leading to a predicted gauge G5' equal to the gauge G5, the range of uncertainty is altered with improbable results. In the gauge is estimated using the measured force curve 56 and the plate deformation curve 50' for a plate having an entry gauge G6', a gauge G2' results which is less than the predicted gauge G5'. If, however, the gauge is estimated by means of the measured force curve 56 and the mill stretch curve 48', a delivery gauge G3' is calculated as being greater than the entry gauge G6' of the plate.

To determine the best estimate of a gauge G1 within the range of uncertainty bounded by the gauges G2 and G3 as those terms are defined in connection with FIG. 4, the relative probability of error in predicting both draft and mill stretch during a reducing pass must be considered. Experience has shown that it is much more likely that a given percentage error will be made in calculating draft using plate deformation curves than that the same percentage error will be made in calculating stretch using mill stretch curves. To illustrate this statement using arbitrarily selected numbers, it could be said that there is 10 times as much chance of making a 5 percent error in predicting a draft of a given magnitude than of making a 5 percent error in predicting a stretch of the same magnitude when the calculations are made for the same plate at the same level of roll separating force. Expressed differently, the probability of a 5 percent error in stretch would be one-tenth the probability of a 5 percent error in draft where the mill stretch was to be equal to the draft. If the planned draft were one-tenth the predicted mill stretch, however, the probability of a given absolute stretch error would be equal to the probability of that same absolute error in calculated draft. Hence, at this ratio of draft to stretch, the two calculating methods would be equally reliable.

The present invention recognizes that the best estimate of a gauge G1 within the range of uncertainty is the estimate which minimizes the sum of the probability of errors in gauge implied by the choice of a particular gauge estimate within the range of uncertainty. The sum is generally minimized where the probabilities of stretch and draft errors are equal. Thus, the best estimate of gauge is obtained by locating the gauge at the point within the range of uncertainty at which the implied stretch and draft errors have an equal probability of occurrence. In equation form, the best estimate occurs where (1)
$$P \text{ (stretch error)} = \frac{1}{k}\left(\frac{\text{stretch}}{\text{draft}}\right) P \text{ (draft error)}$$

where P( ) signifies the probability of a given error and $k$ is the relative probability of making the same error in predicting draft and stretch where the two are nominally equal.

From (1)

(2)
$$\text{estimated draft error} = \frac{\text{estimated stretch error}}{\frac{\text{stretch}}{k \text{ draft}}}$$

Because the range of uncertainty is determined by the sum of estimated draft and stretch errors or $G_2 - G_3$ using FIG. 4 designations, (3)
$$\text{estimated stretch error} + \frac{\text{estimated stretch error}}{\frac{\text{stretch}}{k \text{ draft}}}$$
$$= G_2 - G_3,$$

or (4)
$$\text{estimated stretch error} \left(\frac{1}{1 + \frac{\text{stretch}}{k \text{ draft}}}\right) = G_2 - G_3$$

Therefore,
$$\text{estimated stretch error} = \left(\frac{G_2 - G_3}{1 + \frac{k \text{ draft}}{\text{stretch}}}\right)$$

By adding the estimated stretch error to the estimated gauge established by the mill stretch curve and the measured force curve, the best estimate of gauge G1 is seen to be, in terms of FIG. 4 designations:

$$G1 = G3 + \left(\frac{G2 - G3}{1 + \frac{k \text{ draft}}{\text{stretch}}}\right)$$

Figure 6:
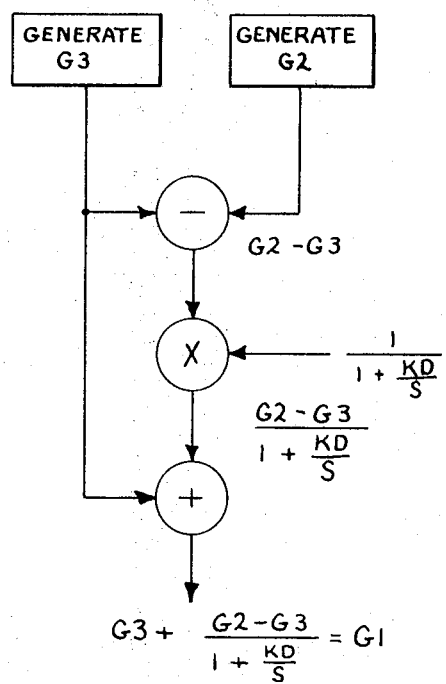
FIG. 6 is a flow chart depicting a first method of carrying out the present invention.

The method used to estimate gauge with the formula developed above is explained with reference to the flow chart of FIG. 6 and the graph of FIG. 4. Before carrying out the reducing pass for which a delivery gauge G1 is to be estimated, the draft and mill stretch which are predicted for that rolling pass are calculated with known mill stretch data and known plate deformation data. The two sets of data form curves which intersect at a predetermined force level to define the predicted gauge G5. Given the draft D and stretch S from these calculations, the quantity $$1 + \frac{KD}{S}$$

is calculated. Later, while the reducing pass is in progress, the roll separating forces caused by the passage of the plate are monitored by a force transducer. The first operation in the method is to generate a signal representative of the gauge G3 defined by the intersection of the measured force curve and the mill stretch curve. In a simultaneous operation, another signal is generated to represent a gauge G2 defined by the intersection of the measured force curve and the plate deformation curve. Given the signals representing the gauges G2 and G3, the range of uncertainty is defined in a subtracting operation as G2—G3. In the next operation, the signal representing the range of uncertainty is multiplied by the inverse of the earlier-calculated signal $$1 + \frac{KD}{S}$$

to produce a modified signal representing the estimate of error. The last operation in the method is the addition of signals representing the estimate of error and the gauge G3 to produce the estimated gauge signal G1.

Figure 7:
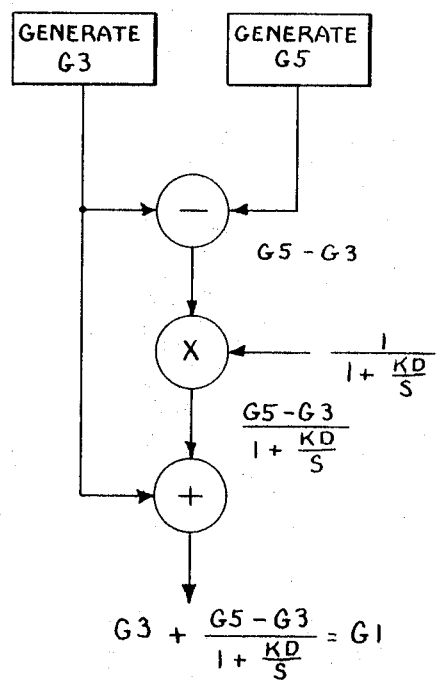
FIG. 7 is a flow chart depicting an alternate method of carrying out the present invention.

FIG. 7 shows an alternate method of practicing the present invention when the signal defined by the intersection of the measured force curve and the plate deformation curve is not available. The alternate method is based on the fact that, in rolling thin hard workpieces, the magnitude of draft is usually quite small, relative to the magnitude of stretch and the predicted gauge G5 closely approaches the gauge G2 defined by the intersection of the plate deformation curve and the measured force curve. Referring to FIG. 4, these conditions exist when the plate deformation curve 50 is nearly vertical as it is for thin, hard workpieces. As an approximation, the predicted gauge G5, determined by the intersection of the mill stretch curve and the plate deformation curve, is used in place of the gauge G2 defined by the intersection of the measured force curve and plate deformation curve. A signal representing the predicted gauge G5 is combined with a signal representing the gauge G3 in a subtracting operation which defines a range of uncertainty G5—G3. In the next operation in the alternate method, the range of uncertainty is multiplied by the inverse of the quantity $$1+\frac{KD}{S}.$$

to produce an estimate of error. In the last operation in the alternate method, the signal representing the estimate of error is added to the signal representing the gauge G3 to produce the estimated gauge signal G1.

The accuracy of the alternate method may be enhanced by multiplying the estimate of error by a multiplier $$\frac{S+D}{S}.$$

The multiplier increases the estimate of error to partially offset the initial reduction in the range of uncertainty which occurs when the predicted gauge G5 is substituted for the gauge G2 as one limit for the range.

It is clear that, with both the primary and alternate methods, the estimated gauge is close to the gauge defined by the intersection of the measured force curve and the mill stretch curve when the draft is comparable in size or is larger than the stretch. As the draft becomes small relative to the stretch, the estimated gauge shifts toward the gauge defined by the measured force curve and the plate deformation curve.

Figure 8:
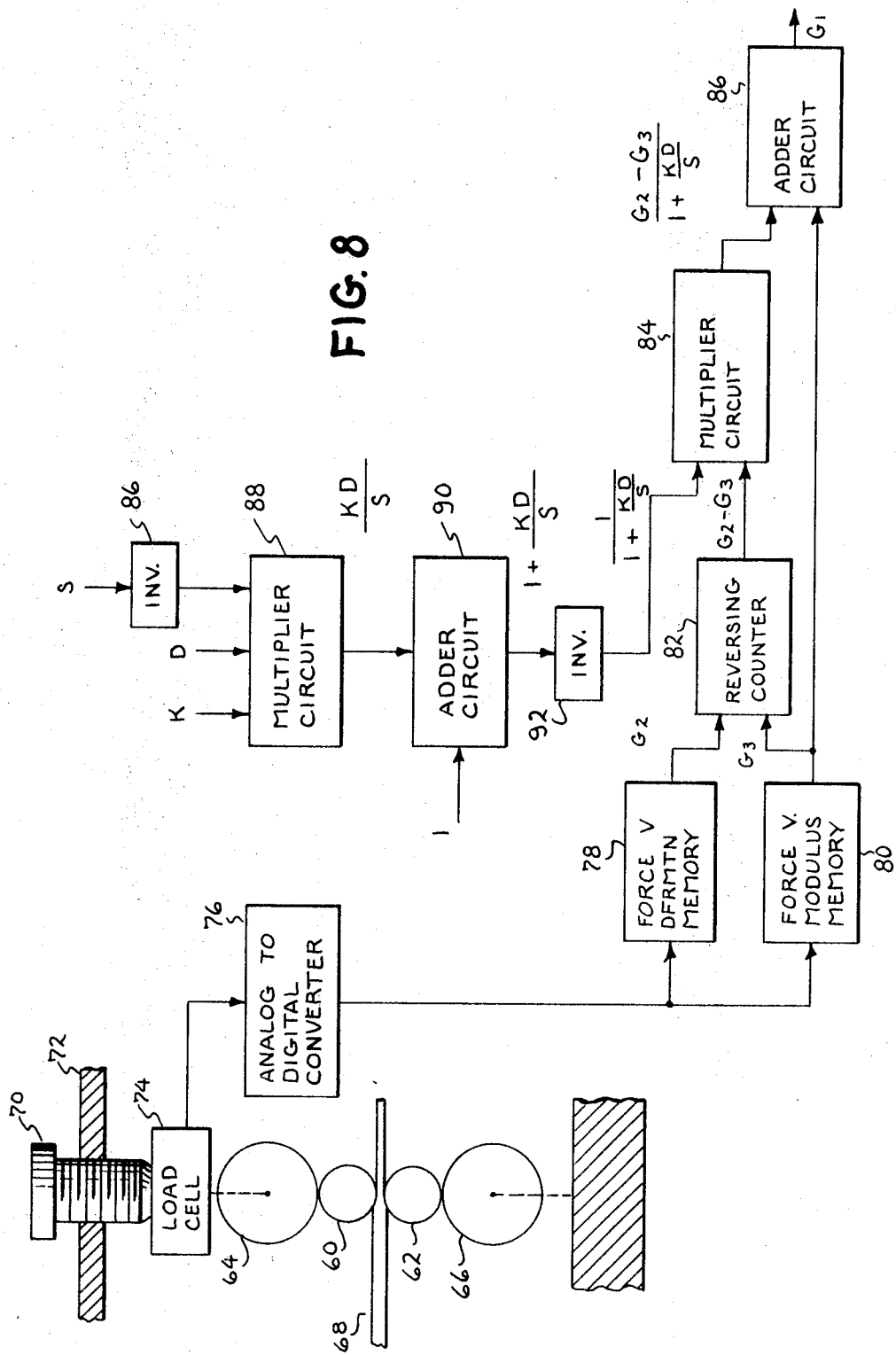
FIG. 8 is a block diagram of one embodiment of an apparatus for carrying out the present invention.

FIG. 8 shows one form of apparatus for carrying out the present invention. A rolling mill is shown as a pair of work rolls 60 and 62 urged toward one another by a pair of backup rolls 64 and 66 against the separating forces caused by the passage of a plate 68 between the rolls. The initial separation of the work rolls 60 and 62 is established by a screw 70 which may be rotated in an anchored nut 72 in a mill housing. A force transducer or load cell 74 is interposed between the lower end of the screw 70 and an end support for the backup roll 64. The roll separating forces produced by the workpiece 68 during its passage between the rolls 60 and 62 are transmitted through the rolls 60 and 64 to the load cell 74. In the particular apparatus shown, the load cell 74 produces an analog signal which is converted to a digital signal by an analog to digital converter 76. This digital signal is applied to memory units 78 and 80 which respond to a measured force input by producing signals representing the gauges G2 and G3. The signal representing the gauge G2 is used to preset a reversing counter 82, the present contents of which would be altered by the magnitude of the signal representing the gauge G3. The final output of the reversing counter 82 is the digital equivalent of G2—G3 which establishes the range of uncertainty. The magnitude of the signal representing the range of uncertainty is modified in a multiplier circuit 84 as a function of the predicted draft, the predicted stretch, and the relative probability of error. The signal representing these quantities is developed through another branch in the circuit.

In the first step in developing the modifying signal, the quantity S representing the predicted stretch is inverted by an inverter 86 and is applied to a multiplier circuit 88 along with signals representing the value of the predicted draft D and the relative probability of error K in predicting draft and stretch. The output of the multiplier circuit 88 is applied to an adder circuit 90 to produce the quantity $$1+\frac{KD}{S}$$

which is inverted by an inverter 92 before being applied at the input to the multiplier circuit 84. The output of the multiplier circuit 84 is the estimate of error G4 which is added to the signal representing the gauge G3 from the memory unit 80 in an adder circuit 86. The output of the adder circuit 86 is a signal representing the estimated gauge G1.

Although particular digital elements have been described in the system shown in FIG. 8, it is well within the capabilities of those skilled in the art to provide different digital arrangements or to provide analog circuits which would accomplish the same functions.

If the alternate method of computation, described with reference to FIG. 7 is adopted, the memory unit 78 would be replaced with a memory unit containing data on known stretch and deformation characteristics. In this case, the memory unit need not be connected to the load cell 74.

I claim:

1. For use in a reducing mill having opposed reducing surfaces and means for measuring surface separating forces produced upon the passage of a workpiece between the opposed surfaces during a reducing pass, an improved apparatus for estimating the gauge G1 of thin, hard workpieces after the reducing pass within a range of uncertainty bounded by a first gauge G2 defined by the intersection of the measured force curve with an appropriate workpiece deformation curve and by a second gauge G3 defined by the intersection of the measured force curve with an appropriate mill stretch curve, said apparatus including:
   a. means for establishing a first signal representative of the magnitude of the gauge G3;
   b. means for establishing a second signal representative of the range of uncertainty;
   c. means for modifying the second signal as a function of the planned draft, the predicted mill stretch, and the relative probability of error in predicting both draft and mill stretch; and
   d. means for combining the first signal and the modified second signal to produce a third signal representative of the gauge G1.

2. An improved apparatus as recited in claim 1 wherein said modifying means includes:
   a. means for generating a fourth signal representative of the quantity $$\frac{1}{1+\frac{KD}{S}}$$

where D is the predicted draft during the reducing pass, S is the predicted mill stretch during the reducing pass, and K is the relative probability of error in predicting both draft and mill stretch; and
   b. means for multiplying the fourth signal and the second signal to produce the modified second signal.

3. For use in a reducing mill having opposed reducing surfaces and means for measuring surface separating forces produced upon the passage of a workpiece between the reducing surfaces during a reducing pass, an improved method of estimating the gauge G1 of thin, hard workpieces following the reducing pass including the steps of:
   a. generating a signal representing a gauge G2 defined by the intersection of the measured force curve and an appropriate workpiece deformation curve;
   b. generating a signal representing a gauge G3 defined by the intersection of the measured force curve and an appropriate stretch curve;
   c. generating a signal representing a range of uncertainty defined as the difference between the signals representing gauges G2 and G3;
   d. generating a signal representing an estimated stretch error by altering the signal representing the range of uncertainty as a function of the predicted draft, the predicted mill stretch, and the relative probability of error in predicting both draft and stretch; and
   e. generating a signal representing the estimated gauge G1 by adding the signals representing the gauges G3 and the estimated stretch error.

4. An improved method of estimating the gauge G1 as recited in claim 3 wherein the signal representing the estimated stretch error is generated as the product of the signal representing the range of uncertainty and of a signal representing the quantity $$\frac{1}{1+\frac{KD}{S}}$$

where D is the predicted draft on the reducing pass, S is the predicted mill stretch for the reducing pass, and K is the relative probability of error in predicting both draft and mill stretch.

5. For use in a reducing mill having opposed reducing surfaces and means for measuring surface separating forces produced upon the passage of a workpiece between the reducing surfaces during a reducing pass, an improved apparatus for estimating the gauge G1 of thin, hard workpieces after the reducing pass within a range of uncertainty bounded by a predicted gauge G5 defined by the intersection of an appropriate workpiece deformation curve and an appropriate mill stretch curve and by a gauge G3 defined by the intersection of the measured force curve with the mill stretch curve, said apparatus including:
  a. means for establishing a first signal representative of the magnitude of the gauge G3;
  b. means for establishing a second signal representative of the range of uncertainty;
  c. means for modifying the second signal as a function of the predicted draft, the predicted mill stretch, and the relative probability of error in predicting both draft and mill stretch; and
  d. means for combining the first signal and the modified second signal to produce a third signal representative of the gauge G1.

6. An improved apparatus as recited in claim 5 wherein said modifying means includes:
  a. means for generating a fourth signal representative of the quantity $$\frac{1}{1+\frac{KD}{S}}$$

where D is the predicted draft during the reducing pass, S is the predicted mill stretch during the reducing pass, and K is the relative probability of error in predicting both draft and stretch; and
  b. means for multiplying the fourth signal and the second signal to produce the modified second signal.

7. An improved apparatus as recited in claim 6 further including:
  a. means for generating a fifth signal representative of the quantity $$\frac{S+D}{S}; \text{ and}$$

b. means for multiplying the fifth signal and the modified second signal to further modify the second signal.

8. For use in a reducing mill having opposed reducing surfaces and means for measuring the surface separating forces produced upon the passage of a workpiece between the opposed reducing surfaces during a reducing pass, an improved method of estimating the gauge G1 of thin, hard workpieces following the reducing pass, including the steps of:
  a. generating the signal representing the gauge G5 defined by the intersection of an appropriate mill stretch curve and an appropriate workpiece deformation curve for the reducing pass;
  b. generating a signal representing a gauge G3 defined by the intersection of the measured force curve and the mill stretch curve;
  c. generating a signal representing a range of uncertainty defined as the difference between the signals representing gauges G5 and G3;
  d. generating a signal representing an estimated stretch error by modifying the signal representing the range of uncertainty as a function of the draft predicted for the reducing pass, the mill stretch predicted for the reducing pass, and the relative probability of error in predicting both draft and stretch; and
  e. generating a signal representing the estimated gauge G1 by adding the signal representing the gauges G3 and the estimated stretch error.

9. An improved method of estimating the gauge G1 as recited in claim 8 wherein the signal representing the estimated stretch error is generated as the product of the signal representing the range of uncertainty and of the signal representing the quantity $$\frac{1}{1+\frac{KD}{S}}$$

where D is the predicted draft on the reducing pass, S is the predicted mill stretch, and K is the relative probability of error in predicting both draft and stretch.

10. An improved method of estimating the gauge G1 as recited in claim 9 including the further step of refining the signal defined therein by multiplying the defined signal by the quantity $$\frac{S+D}{S}$$